United States Patent
Georgin (10) Patent No.: US 11,458,938 B2
(45) Date of Patent: Oct. 4, 2022

(54) AUTOBRAKE INITIALIZATION SYSTEMS AND METHODS

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 486 days.

(21) Appl. No.: 16/581,131

(22) Filed: Sep. 24, 2019

(65) Prior Publication Data

US 2021/0086734 A1 Mar. 25, 2021

(51) Int. Cl.
| | |
|---|---|
| *B60T 8/17* | (2006.01) |
| *B60T 7/12* | (2006.01) |
| *B60T 8/171* | (2006.01) |
| *B60T 8/18* | (2006.01) |
| *B64C 25/26* | (2006.01) |
| *B64C 25/36* | (2006.01) |
| *B64C 25/44* | (2006.01) |

(52) U.S. Cl.
CPC .............. *B60T 8/1703* (2013.01); *B60T 7/12* (2013.01); *B60T 8/171* (2013.01); *B60T 8/18* (2013.01); *B64C 25/26* (2013.01); *B64C 25/36* (2013.01); *B64C 25/44* (2013.01); *B60T 2240/06* (2013.01)

(58) Field of Classification Search
CPC .......... B60T 8/1703; B60T 8/171; B60T 8/18; B60T 7/12; B60T 2240/06; B64C 25/26; B64C 25/36; B64C 25/44
USPC ............................................................. 701/3
See application file for complete search history.

(56) References Cited

U.S. PATENT DOCUMENTS

| | | | |
|---|---|---|---|
| 3,129,903 A | 4/1964 | Dewar et al. | |
| 4,076,331 A | 2/1978 | DeVlieg | |
| 4,367,529 A | 1/1983 | Masclet et al. | |
| 6,513,885 B1* | 2/2003 | Salamat | B60T 8/1703 303/DIG. 9 |
| 6,820,946 B2 | 11/2004 | Salamat et al. | |
| 8,965,657 B2 | 2/2015 | Georgin et al. | |
| 9,738,378 B1 | 8/2017 | Nikolic et al. | |
| 9,981,754 B2 | 5/2018 | Georgin | |
| 10,112,704 B2 | 10/2018 | Di Zazzo et al. | |
| 2010/0286880 A1* | 11/2010 | Cahill | B60T 17/221 701/70 |

(Continued)

FOREIGN PATENT DOCUMENTS

GB 2458378 9/2009

OTHER PUBLICATIONS

European Patent Office, European Search Report dated Jul. 17, 2020 in Application No. 19216708.8.

*Primary Examiner* — Gertrude Arthur Jeanglaude
(74) *Attorney, Agent, or Firm* — Snell & Wilmer L.L.P.

(57) ABSTRACT

An autobrake brake control system includes a shutoff valve configured to receive a hydraulic fluid, a servo valve configured to receive the hydraulic fluid from the shutoff valve and configured to provide the hydraulic fluid to apply braking force to a wheel via a hydraulic line, and a brake control unit in electronic communication with the shutoff valve. The brake control unit is configured to detect a weight-on-wheel (WOW) condition of a nose landing gear, and the brake control unit controls the shutoff valve in response to detecting the WOW condition of the nose landing gear.

18 Claims, 5 Drawing Sheets

(56) References Cited

U.S. PATENT DOCUMENTS

| | | | |
|---|---|---|---|
| 2010/0292889 A1* | 11/2010 | Cahill | B60T 8/885 701/29.1 |
| 2015/0127195 A1* | 5/2015 | Cahill | B60T 7/042 701/3 |
| 2019/0176966 A1 | 6/2019 | Eddy et al. | |

* cited by examiner

AUTOBRAKE INITIALIZATION SYSTEMS AND METHODS

FIELD

In general, the arrangements disclosed herein relate to braking systems and methods. More specifically, they relate to systems and methods for autobraking suitable for use in aircraft.

BACKGROUND

A shutoff valve (SOV) is used in brake control systems to provide or cease hydraulic power to servo valves that control brake pressures. The SOV may protect against uncommanded braking during takeoff and/or other aircraft maneuvers. When landing with autobrake selected, a brake control unit requests the SOV to open to provide pressure to the servo valves.

SUMMARY

A brake control system is disclosed, comprising a brake control unit, and a shutoff valve configured to supply hydraulic fluid to a servo valve, wherein the brake control unit is configured to detect a weight-on-wheel (WOW) condition of a nose landing gear, and the brake control unit controls the shutoff valve in response to detecting the WOW condition of the nose landing gear.

In various embodiments, the brake control unit opens the shutoff valve in response to detecting the WOW condition of the nose landing gear.

In various embodiments, the brake control unit receives an autobrake signal, a throttle signal, a main landing gear WOW signal, and a nose gear WOW signal.

In various embodiments, the brake control unit detects the WOW condition of the nose landing gear via the nose gear WOW signal.

In various embodiments, the brake control unit is further configured to detect that an autobrake system is powered on via the autobrake signal, detect that an engine is at or below a predetermined throttle position, and detect that a main landing gear is under a WOW condition.

In various embodiments, the brake control unit controls the shutoff valve based upon the autobrake signal, the throttle signal, the main landing gear WOW signal, and the nose gear WOW signal.

In various embodiments, the brake control system comprises an AND gate, whereby the autobrake signal, the throttle signal, the main landing gear WOW signal, and the nose gear WOW signal are received.

In various embodiments, the brake control unit is configured to open the shutoff valve in response to the shutoff valve autobrake signal, the LH throttle signal, the RH throttle signal, the MLG WOW signal, and the NG WOW signal all being TRUE.

A braking arrangement is disclosed, comprising a shutoff valve configured to receive a hydraulic fluid, a servo valve configured to receive the hydraulic fluid from the shutoff valve and configured to provide the hydraulic fluid to apply braking force to a wheel via a hydraulic line, and a brake control unit in electronic communication with the shutoff valve, wherein the brake control unit is configured to detect a weight-on-wheel (WOW) condition of a nose landing gear, and the brake control unit controls the shutoff valve in response to detecting the WOW condition of the nose landing gear.

In various embodiments, the brake control unit opens the shutoff valve in response to detecting the WOW condition of the nose landing gear.

In various embodiments, the brake control unit receives an autobrake signal, a throttle signal, a main landing gear WOW signal, and a nose gear WOW signal.

In various embodiments, the brake control unit detects the WOW condition of the nose landing gear via the nose gear WOW signal.

In various embodiments, the brake control unit is further configured to detect that an autobrake system is powered on via the autobrake signal, detect that an engine is at or below a predetermined throttle position, and detect that a main landing gear is under a WOW condition.

In various embodiments, the brake control unit controls the shutoff valve based upon the autobrake signal, the throttle signal, the main landing gear WOW signal, and the nose gear WOW signal.

In various embodiments, the brake control system comprises an AND gate, whereby the autobrake signal, the throttle signal, the main landing gear WOW signal, and the nose gear WOW signal are received.

A method for autobrake initialization is disclosed, comprising determining whether a nose landing gear is under a WOW condition, activating autobraking in response to detecting that the nose landing gear is under a WOW condition, and opening a shutoff valve in order to supply hydraulic pressure to a brake system.

In various embodiments, the WOW condition is detected by determining whether a rotational velocity of a wheel has increased above a predetermined threshold value.

In various embodiments, the determining whether a nose landing gear is under a WOW condition includes determining if a NG WOW signal is TRUE.

In various embodiments, the method further comprises determining that an autobrake signal, a LH throttle signal, a RH throttle signal, a MLG WOW signal, and the NG WOW signal are all TRUE.

In various embodiments, the determining whether a nose landing gear is under a WOW condition includes determining if a nose gear WOW signal is TRUE for a predetermined duration.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems, methods, and devices for brake control, such as within a braking system of an aircraft. While numerous details are included herein pertaining to aircraft components, such as brake components, the systems and methods disclosed herein can be applied to other systems with other servo valves and the like.

As used herein, the term "weight-on-wheels (WOW) condition" means that at least a portion of the aircraft is supported on the ground via the landing gear with the associated tire in contact with a ground surface.

A brake control system, as disclosed herein, may include an AND gate which receives, inter alia, a signal from a nose landing gear arrangement for indicating that the nose landing gear is under a weight-on-wheels (WOW) condition.

Figure 1A:
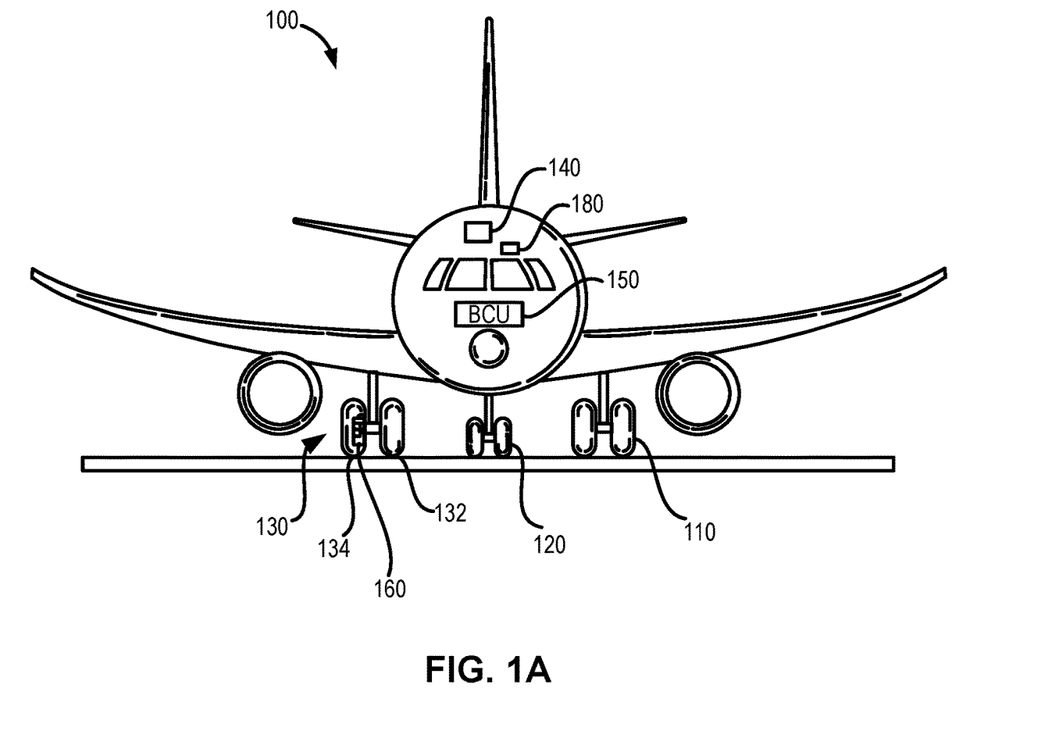
FIG. 1A illustrates an aircraft having multiple landing gear and brakes, in accordance with various embodiments.

Referring now to FIG. 1A, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. With brief reference now to FIG. 1B, the BCU 150 includes one or more controllers 154 (e.g., processors) and one or more tangible, non-transitory memories 156 capable of implementing digital or programmatic logic. In various embodiments, for example, the one or more controllers 154 are one or more of a general purpose processor, DSP, ASIC, FPGA, or other programmable logic device, discrete gate, transistor logic, or discrete hardware components, or any various combinations thereof or the like, and the one or more memories 156 store instructions that are implemented by the one or more controllers 154 for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like. The BCU 150 may further include hardware 158 capable of performing various logic using discreet power signals received from various aircraft systems.

Referring again more particularly to FIG. 1A, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Figure 1B:
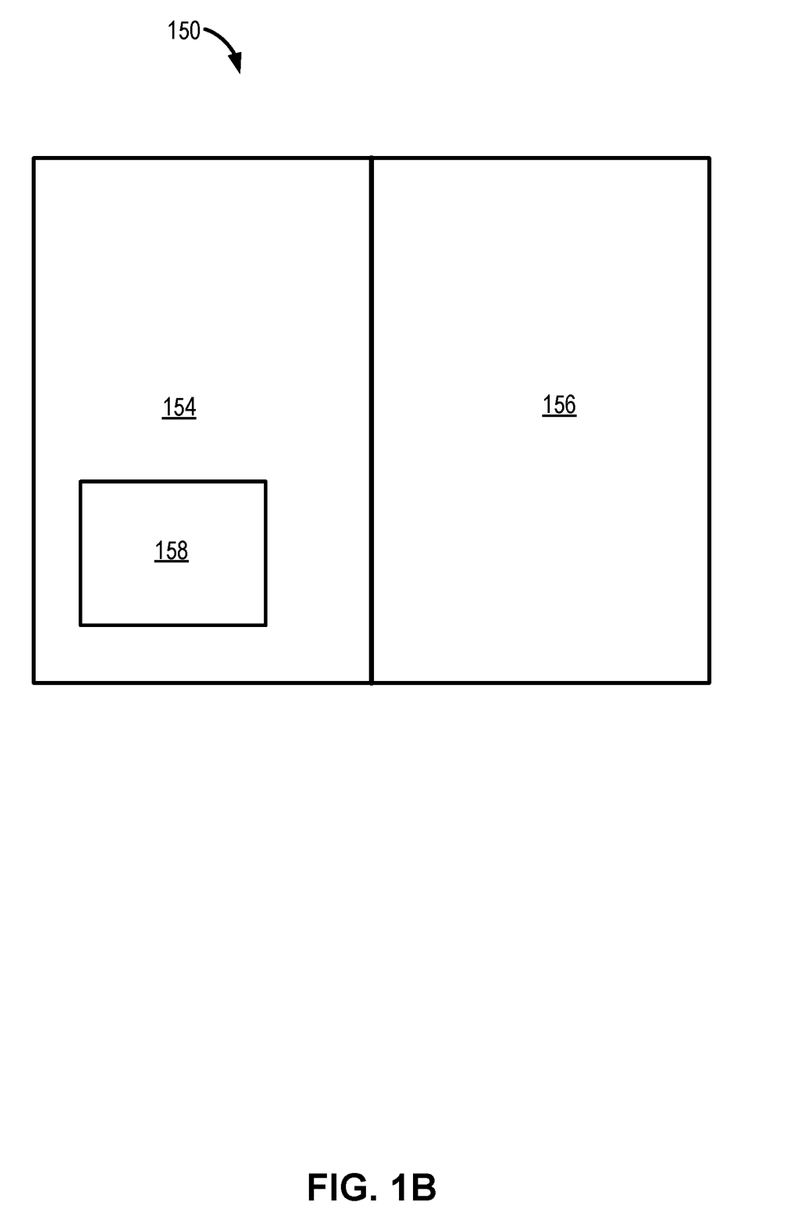
FIG. 1B is a block diagram of a brake control unit of the aircraft of FIG. 1A, in accordance with various embodiments.
Figure 1C:
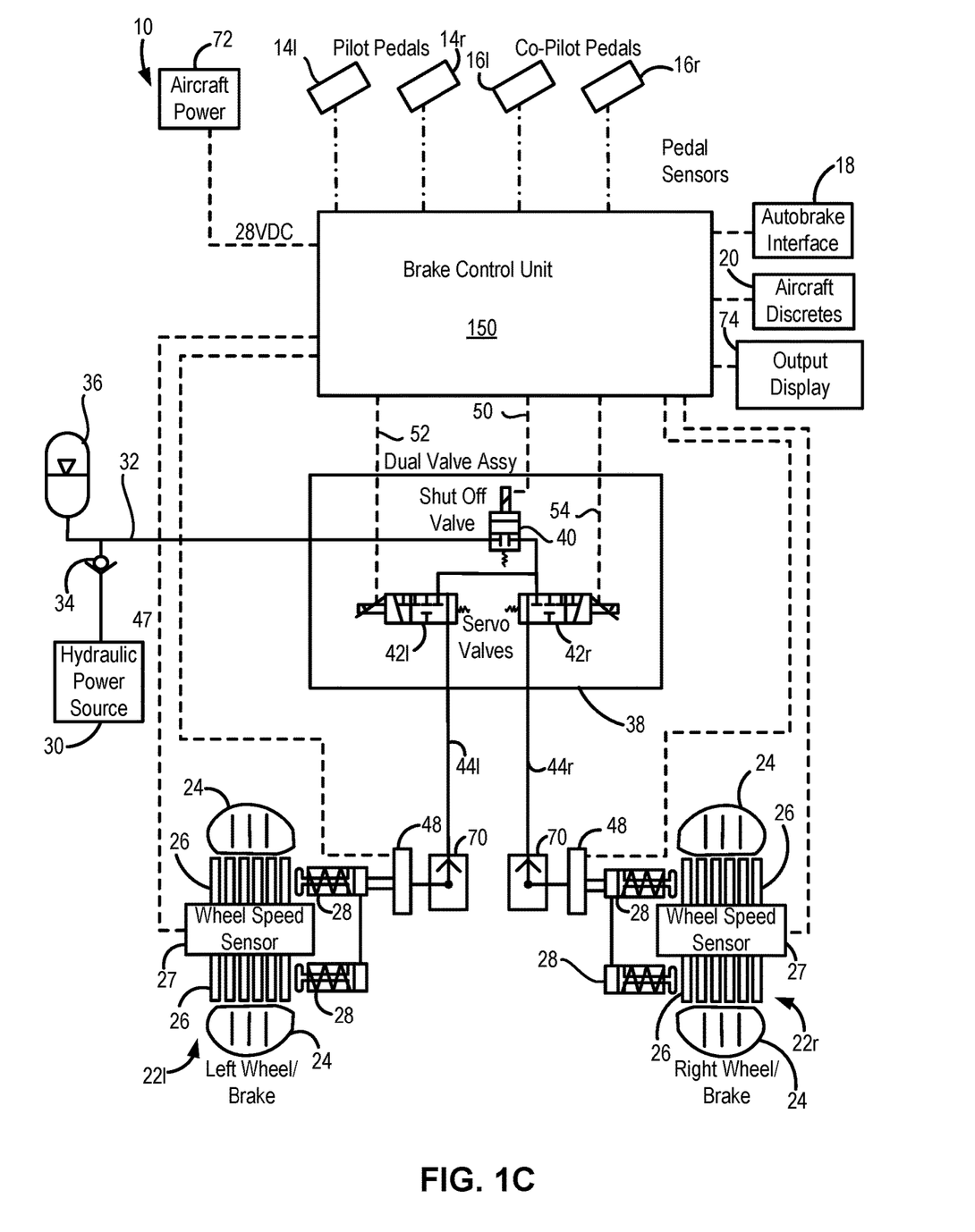
FIG. 1C is a functional diagram of a braking system of the aircraft of FIG. 1A, in accordance with various embodiments.

Referring now also to FIG. 1C, including with continued reference to FIGS. 1A and 1B as well, a braking system 10 is shown in accordance with an embodiment of the inventive arrangements. The braking system 10 includes the brake control unit (BCU) 150 of FIGS. 1A and 1B, which is programmed to control the various braking functions described herein. In various embodiments, the braking system 10 enables the aircraft 100 to brake, thereby slowing aircraft 100 when on the ground. However, it will be appreciated that the braking system 10 may also be used in connection with other types of vehicles without departing from the scope of the inventive arrangements.

As described herein, the braking system generally includes, inter alia, a hydraulic power source 30 acting through i) a left wheel servo valve 42*l* to apply hydraulic pressure through a left hydraulic line 44*l* and shuttle valve 70 to apply a braking force to actuators 28 of a left wheel/brake assembly 22*l*; and ii) a right wheel servo valve 42*r* to apply hydraulic pressure through a right hydraulic line 44*r* and shuttle valve 70 to apply a braking force to actuators 28 of a right wheel/brake assembly 22*r*. First pressure sensors 48 may be intermediate, and in fluid communication with, the actuators 28 and shuttle valves 70 of the left wheel/brake assembly 22*l* and right wheel/brake assembly 22*r*.

In various embodiments, the shuttle valves 70, first pressure sensors 48, and actuators 28 may be common to both a primary braking system and a non-primary braking system of the braking system 10 of the aircraft 100.

In various embodiments of the braking system, the BCU 150 receives brake command signals from a left pilot brake pedal 14*l* and a right pilot brake pedal 14*r* and/or a left co-pilot brake pedal 16*l* and a right co-pilot brake pedal 16*r*. The brake command signals from the left pilot brake pedal 14*l* and the right pilot brake pedal 14*r* and/or the left co-pilot brake pedal 16*l* and the right co-pilot brake pedal 16*r* are indicative of a desired amount of braking. In addition, the BCU 150 receives control signals from an auto-brake interface 18 for performing auto-brake and rejected take-off (RTO) braking functions. The BCU 150 also receives a series of discrete control signals associated with the aircraft 100, generally represented as aircraft discretes 20, for providing braking control thereof.

In various embodiments, the BCU 150 controls braking of the left wheel/brake assembly 22*l* and the right wheel/brake assembly 22*r*, as noted above. The left wheel/brake assembly 22*l* includes one or more wheels 24 and brake stacks 26. A plurality of actuators 28 may be provided for exerting braking forces on the brake stacks 26 in order to brake the wheels 24. The right wheel/brake assembly 22*r* has a similar, mirrored configuration. Both the left wheel/brake assembly 22*l* and the right wheel/brake assembly 22*r* also include, in various embodiments, wheel speed sensors 27 that provide wheel speed information to the BCU 150 for carrying out brake control operations.

In various embodiments of the braking system, a hydraulic power source 30 serves as a primary brake power supply within the braking system 10. In various embodiments, a primary hydraulic line 32 from the hydraulic power source 30 includes a check valve 34 and an accumulator 36. In various embodiments, the primary hydraulic line 32 is input into a brake control module (BCM) 38 included within the braking system 10. The BCM 38 includes a shutoff valve 40 through which the primary hydraulic line 32 supplies hydraulic fluid to the left wheel servo valve 42*l* and the right wheel servo valve 42*r*. In this regard, BCM may be a dual valve assembly. In various embodiments, hydraulic fluid from the left wheel servo valve 42*l* and the right wheel servo valve 42*r* is respectively provided through a left hydraulic line 44*l* and a right hydraulic line 44*r* to apply the braking force to the wheels 24 during a braking operation.

During primary braking operations, hydraulic fluid pressure through the left hydraulic line 44*l* and the right hydraulic line 44*r* respectively passes to the corresponding actuators 28 via one or more of the corresponding shuttle valves 70. Thus, if the braking system 10 is functioning in the primary braking mode, the shutoff valve 40 is open to the left hydraulic line 44*l* and the right hydraulic line 44*r*, and the BCU 150 controls the amount of hydraulic pressure that is delivered to the wheels 24 respectively via the left wheel servo valve 42*l* and the right wheel servo valve 42*r* acting through the corresponding left hydraulic line 44*l* and right hydraulic line 44*r*.

In various embodiments, the shutoff valve 40, the left wheel servo valve 42*l*, and the right wheel servo valve 42*r* are coil valves. In various embodiments, the shutoff valve 40 receives a shutoff valve control signal on a bus 50 from the BCU 150. Similarly, the left wheel servo valve 42*l* may receive a servo valve control signal on a bus 52 from the BCU 150. Likewise, the right wheel servo valve 42*r* may receive a servo valve control signal on a bus 54 from the BCU 150.

In various embodiments, the left pilot brake pedal 14*l* may provide a brake command signal to the BCU 150 that is indicative of a degree of travel of the left pilot brake pedal 14*l*, and thus the amount of desired braking by the left wheel/brake assembly 22*l*. Similarly, the remaining right pilot brake pedal 14*r*, the left co-pilot brake pedal 16*l*, and the right co-pilot brake pedal 16*r* each provide a brake command signal to the BCU 150 that is indicative of a degree of travel of the right pilot brake pedal 14*r*, the left co-pilot brake pedal 16*l*, and the right co-pilot brake pedal 16*r*, respectively, and thus the amount of desired braking by the left wheel/brake assembly 22*l* or right wheel/brake assembly 22*r*. In various embodiments, each brake pedal may have a corresponding transducer respectively serving the BCU 150 to provide the brake command signal to the BCU 150. However, any suitable brake pedal configuration is within the scope of the present disclosure.

In various embodiments, the braking system 10 includes first pressure sensors 48 for monitoring the hydraulic pressure in the left hydraulic line 44*l* and the right hydraulic line 44*r* and providing such information back to the BCU 150. In addition, power to the BCU 150 is provided from an aircraft power source 72, such as a DC power source within the aircraft 100. In various embodiments, power is transmitted from the aircraft power source 72 to the BCU 150.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or output display 74 to output the health status of the braking system 10, including the various components thereof.

In various embodiments, the braking system 10 may be activated by the left pilot brake pedal 14*l*, the right pilot brake pedal 14*r*, the left co-pilot brake pedal 16*l*, and the right co-pilot brake pedal 16*r* respectively acting through the shutoff valve 40, the left wheel servo valve 42*l*, the right wheel servo valve 42*r*, the left hydraulic line 44*l*, and the right hydraulic line 44*r*.

The braking system 10 utilizes the shutoff valve 40 in-line with the left wheel servo valve 42*l* and the right wheel servo valve 42*r* to provide a level of redundancy that ensures a single valve failure cannot cause inadvertent braking. In order for the braking force to be applied by the braking system 10 to the left wheel/brake assembly 22*l* and the right wheel/brake assembly 22*r*, the shutoff valve 40 must be open along with at least one of the left wheel servo valve 42*l* and the right wheel servo valve 42*r*. To provide a redundancy so that the brakes can be operated when commanded, each of the valves (shutoff and servo) may contain dual control coils with one coil for different dedicated channels in the BCU 150, in accordance with various embodiments.

Figure 2:
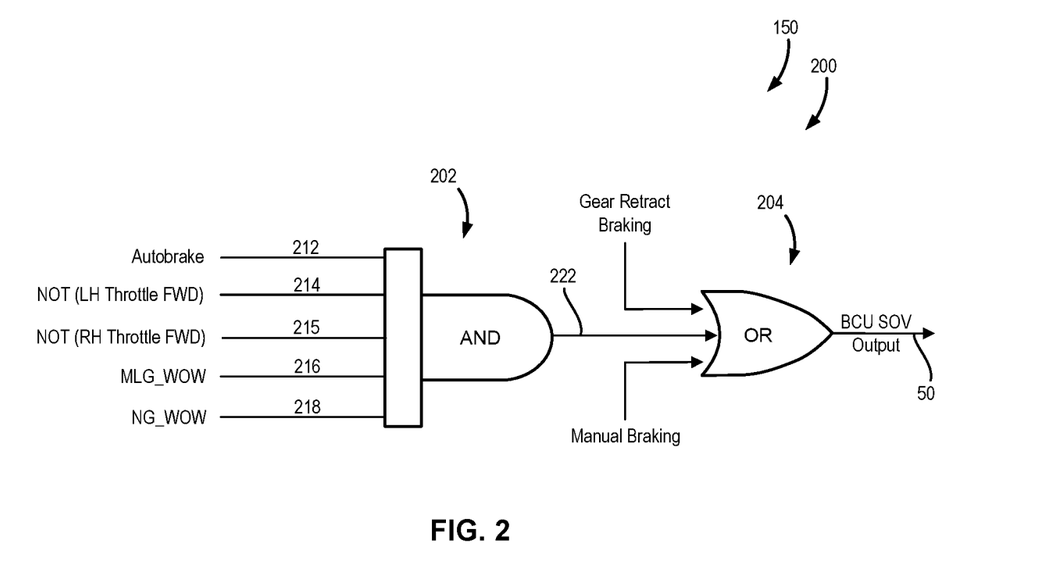
FIG. 2 is a schematic view of an autobrake initialization logic for a brake control unit, in accordance with various embodiments.

Referring now to FIG. 2, and also to FIG. 1C, an autobrake initialization system 200 for BCU 150 for controlling shutoff valve 40 is illustrated, in accordance with various embodiments. Autobrake initialization system 200 may include an AND gate 202 configured to receive a plurality of signals for indicating that an aircraft is in a desirable condition for braking. AND gate 202 may output a shutoff valve signal 222 in response to all of the signals being true (e.g., in response to receiving power from all of the signals) for opening shutoff valve 40. AND gate 202 may receive an autobrake signal 212. Autobrake signal 212 may be sent in response to a signal from an operator of the aircraft (e.g., a pilot may actuate a switch in the cockpit) which indicates that autobraking is desired. AND gate 202 may receive a left hand (LH) throttle signal 214. LH throttle signal 214 may be sent in response to a throttle position of a left hand engine being set below a predetermined position (e.g., at idle). For example, AND gate 202 may receive LH throttle signal 214 from an avionics unit or other on-board controller which monitors the throttle position of the aircraft engines. AND gate 202 may receive a right hand (RH) throttle signal 215. RH throttle signal 215 may be sent in response to a throttle position of a right hand engine being set below a predetermined position (e.g., at idle). AND gate 202 may receive a main landing gear (MLG) weight-on-wheel (WOW) signal 216. MLG WOW signal 216 may be sent in response to an aircraft's main landing gear touching down onto a ground surface. In various embodiments, the MLG WOW signal 216 is sent in response to an aircraft's main landing gear touching down onto a ground surface for a predetermined amount of time to ensure that the main landing gear is not bouncing on the ground surface during braking. AND gate 202 may receive MLG WOW signal 216 from an avionics unit or other on-board controller which monitors the landing gear position (e.g., whether the shock strut is compressed) and/or which monitors the rotational velocity of the aircraft wheels. For example, a compressed shock strut may indicate that the main landing gear has touched the ground surface and is partially supporting the aircraft. Furthermore, a rotational velocity of a wheel may indicate that the wheel is rotating against the ground surface. However, any system and/or method of determining that a main landing gear in under a WOW condition is within the scope of the present disclosure.

Furthermore, AND gate 202 may receive a nose gear (NG) WOW signal 218. NG WOW signal 218 may be sent in response to an aircraft's nose landing gear (e.g., see second landing gear 120 of FIG. 1A) touching down onto a ground surface. In various embodiments, the NG WOW signal 218 is sent in response to the aircraft's nose landing gear touching down onto the ground surface for a predetermined amount of time, such as one second for example, to ensure that the nose landing gear is not bouncing on the ground surface during braking. For example, premature braking while the nose landing gear is in the air may cause the nose landing gear to slap against the ground surface. AND gate 202 may receive NG WOW signal 218 from an avionics unit or other on-board controller (e.g., a landing gear control unit) which monitors the landing gear position (e.g., whether the shock strut for the nose landing gear is compressed) and/or which monitors the rotational velocity of the aircraft wheels at the nose landing gear. For example, a compressed shock strut may indicate that the nose landing gear has touched the ground surface and is partially supporting the aircraft. Furthermore, a rotational velocity of a wheel may indicate that the wheel is rotating against the ground surface. For example, a rotational velocity of a wheel increasing above a pre-determined threshold value may indicate a WOW condition. However, any system and/or method of determining that a nose gear in under a WOW condition is within the scope of the present disclosure.

AND gate 202 may output shutoff valve signal 222 in response to all of the signals being true (e.g., in response to the autobrake signal 212 indicating that the autobrake system is powered on, in response to LH throttle signal 214 indicating that the LH engine is at or below a predetermined throttle position, in response to RH throttle signal 215 indicating that the RH engine is at or below a predetermined throttle position, in response to the MLG WOW signal 216 indicating that the main landing gear is under a WOW condition, and in response to the NG WOW signal 218 indicating that the nose landing gear is under a WOW condition) for opening shutoff valve 40. In this manner, the aircraft brake system is operated only under conditions where the nose gear has contacted the ground surface. In this manner, the autobraking system cannot be operated while the nose landing gear is not in contact with the ground surface, thereby eliminating the nose landing gear from contacting the ground surface during a braking maneuver.

Autobrake initialization system 200 may further include an OR gate 204 configured to receive SOV control signals from various systems. For example, OR gate 204 may receive a control signal from the autobrake system (e.g., shutoff valve signal 222), a gear retract braking control signal (e.g., to apply braking during gear retracting), and a manual braking control signal (e.g., for a pilot to manually apply braking from the cockpit). The OR gate 204 may supply a shutoff valve control signal, e.g., via bus 50, in response to receiving a control signal from any one of the autobrake, gear retract, or manual braking systems. In this manner, hydraulic pressure is supplied to the braking system in response to any of these various braking systems being operated.

In various embodiments, AND gate 202 may comprise a hardware component. AND gate 202 may comprise one or more field-effect transistors (FETs) electronically coupled together in a known manner. AND gate 202 may provide a HIGH output (1) only if all the inputs to the AND gate 202 are HIGH (1). If none or not all inputs to the AND gate are HIGH, a LOW (0) output may result. In this regard, each signal 212, 214, 215, 216, 218 may be received by the AND gate via a plurality of electrical wires or other conductive material. Stated differently, a conductive material may be used to electronically couple AND gate 202 to the respective electronic components whereby the signals 212, 214, 215, 216, 218 are received. However, AND gate 202 may be implemented in software without departing from the scope of the present disclosure.

In various embodiments, OR gate 204 may comprise a hardware component. OR gate 204 may comprise one or more FETs electronically coupled together in a known manner. In this regard, AND gate 202 may be electronically coupled to OR gate 204 via one or more wires or other conductive material. However, OR gate 204 may be implemented in software without departing from the scope of the present disclosure.

Figure 3:
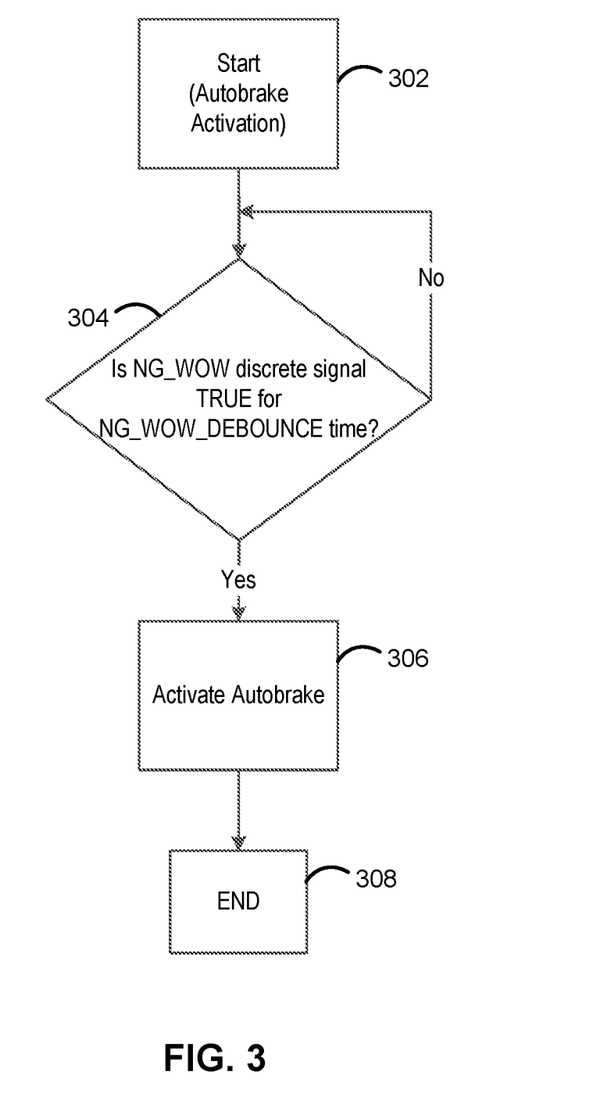
FIG. 3 is a flowchart of a method of autobrake initialization, in accordance with various embodiments.

Referring now to FIG. 3, a method of autobrake initialization is provided. More specifically, the method begins in a step 302, after which it is determined if a nose landing gear is under a WOW condition at a step 304. If a WOW is not detected at step 304, then the method continues by determining if the nose landing gear is under a WOW condition. If a WOW condition of the nose landing gear is detected at step 304, then the method activates autobraking at a step 306, after which the method of FIG. 3 ends at step 308.

Referring now to FIG. 1C, FIG. 2, and FIG. 3, step 302 may include activating, by a pilot, an autobraking system, for example by actuating a switch, lever, button, or the like in the cockpit of the aircraft. AND gate 202 may receive autobrake signal 212 (e.g., an electric power signal) in response to a pilot activating the autobrake system. Step 304 may include determining, by the brake control unit 150, if a nose landing gear (e.g., second landing gear 120) is under a WOW condition. Step 304 may include determining, by the brake control unit 150, if NG WOW signal 218 is TRUE for a predetermined duration, such as one second for example. The predetermined duration may be any suitable duration for indicating that the nose landing gear is under a WOW condition and not bouncing. Step 306 may include determining, by the brake control unit 150, that the autobrake signal 212, the LH throttle signal 214, the RH throttle signal 215, the MLG WOW signal 216, and the NG WOW signal 218 are all TRUE. Step 306 may further include sending, by the brake control unit, a shutoff valve control signal to shutoff valve 40 to open the shutoff valve 40 in order to supply hydraulic pressure to the brake system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A brake control system, comprising:
   a brake control unit configured to receive an autobrake control signal and a nose gear weight-on-wheel, WOW, signal; and
   a shutoff valve configured to supply hydraulic fluid to a servo valve;
   wherein the brake control unit is configured to detect a WOW condition of a nose landing gear via the nose gear WOW signal, and
   the brake control unit opens the shutoff valve in response to detecting at least the WOW condition of the nose landing gear and the autobrake system is powered on.

2. The brake control system of claim 1, wherein the brake control unit receives:
   a throttle signal; and
   a main landing gear WOW signal.

3. The brake control system of claim 2, wherein the brake control unit is further configured to:
   detect that an engine is at or below a predetermined throttle position via the throttle signal; and
   detect that a main landing gear is under a WOW condition via the main landing gear WOW signal.

4. The brake control system of claim 3, wherein the brake control unit controls the shutoff valve based upon the autobrake signal, the throttle signal, the main landing gear WOW signal, and the nose gear WOW signal.

5. The brake control system of claim 4, wherein the brake control system comprises an AND gate, whereby the autobrake signal, the throttle signal, the main landing gear WOW signal, and the nose gear WOW signal are received.

6. The brake control system of claim 5, wherein the brake control unit is configured to open the shutoff valve in response to the autobrake signal, the throttle signal the main landing gear WOW signal, and the nose gear WOW signal all being TRUE.

7. The brake control system of claim 1, wherein detecting the WOW condition includes determining if the nose gear WOW signal is TRUE for a predetermined duration.

8. A braking arrangement, comprising:
   a shutoff valve configured to receive a hydraulic fluid;
   a servo valve configured to receive the hydraulic fluid from the shutoff valve and configured to provide the hydraulic fluid to apply braking force to a wheel via a hydraulic line; and
   a brake control unit in electronic communication with the shutoff valve, wherein the brake control unit is configured to receive an autobrake control signal and a nose gear weight-on-wheel, WOW, signal;

wherein the brake control unit is configured to detect a WOW condition of a nose landing gear via the nose gear WOW signal, and the brake control unit opens the shutoff valve in response to detecting at least the WOW condition of the nose landing gear and the autobrake system is powered on.

9. The braking arrangement of claim 8, wherein the brake control unit receives:
a throttle signal;
a main landing gear WOW signal.

10. The braking arrangement of claim 9, wherein the brake control unit is further configured to:
detect that an engine is at or below a predetermined throttle position via the throttle signal; and
detect that a main landing gear is under a WOW condition via the main landing gear WOW signal.

11. The braking arrangement of claim 10, wherein the brake control unit controls the shutoff valve based upon the autobrake signal, the throttle signal, the main landing gear WOW signal, and the nose gear WOW signal.

12. The braking arrangement of claim 11, wherein the brake control unit comprises an AND gate, whereby the autobrake signal, the throttle signal, the main landing gear WOW signal, and the nose gear WOW signal are received.

13. The braking arrangement of claim 8, wherein detecting the WOW condition includes determining if the nose gear WOW signal is TRUE for a predetermined duration.

14. A method for autobrake initialization, comprising:
determining whether a nose landing gear is under a WOW condition;
activating autobraking in response to detecting that the nose landing gear is under a WOW condition; and
opening a shutoff valve in order to supply hydraulic pressure to a brake system in response to determining the nose landing gear is under the WOW condition and activating autobraking.

15. The method of claim 14, wherein the WOW condition is detected by determining whether a rotational velocity of a wheel has increased above a pre-determined threshold value.

16. The method of claim 14, wherein the determining whether the nose landing gear is under a WOW condition includes determining if a nose gear, NG, WOW signal is TRUE.

17. The method of claim 16, further comprising determining that an autobrake signal, a left hand, LH, throttle signal, a right hand, RH, throttle signal, a main landing gear, MLG, WOW signal, and the nose gear, NG, WOW signal are all TRUE.

18. The method of claim 17, wherein the determining whether the nose landing gear is under a WOW condition includes determining if a nose gear WOW signal is TRUE for a predetermined duration.

* * * * *